Feb. 6, 1940.  C. A. GUSTAFSON  2,189,286
ROAD MACHINE
Filed April 27, 1931   15 Sheets-Sheet 1
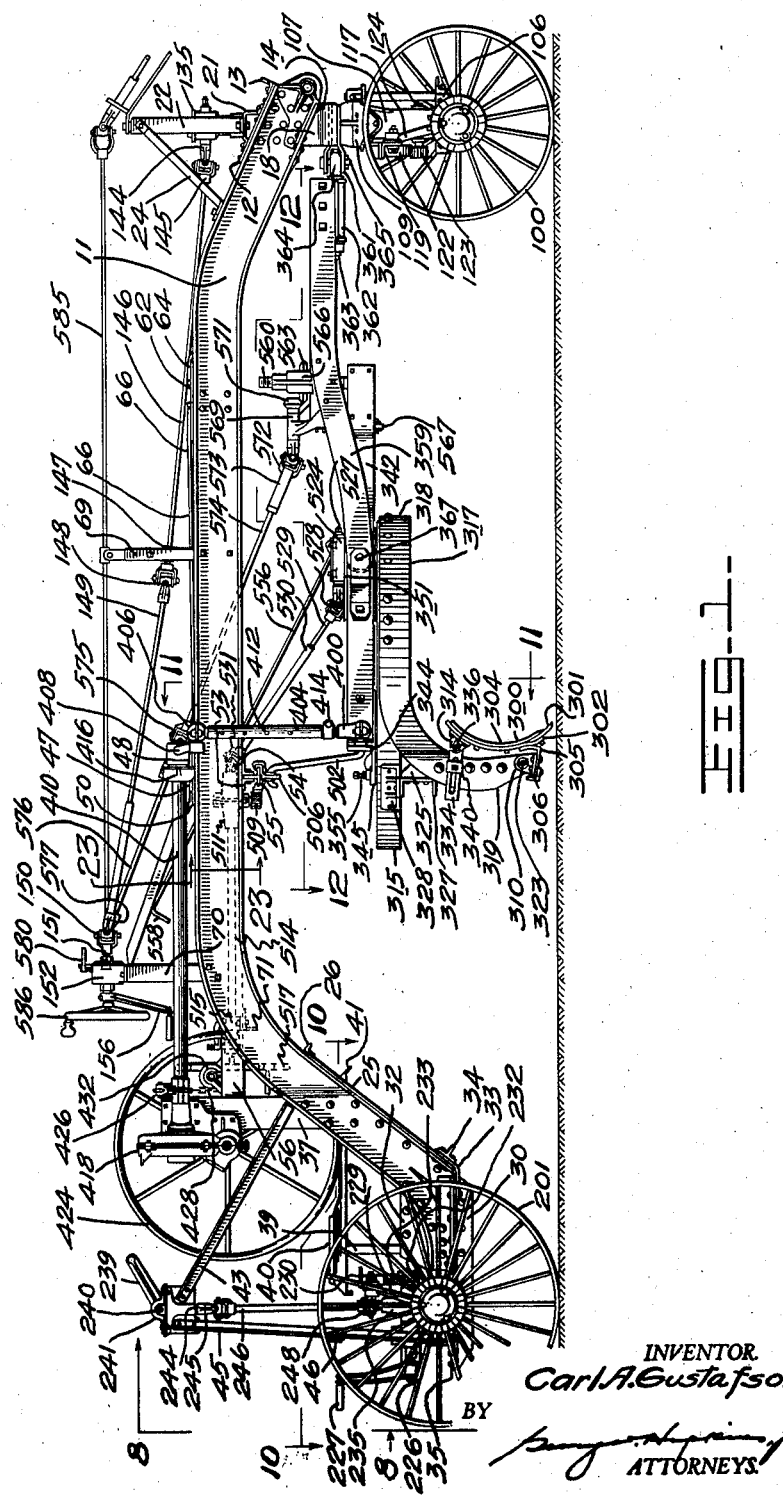
INVENTOR.
Carl A. Gustafson
BY
ATTORNEYS

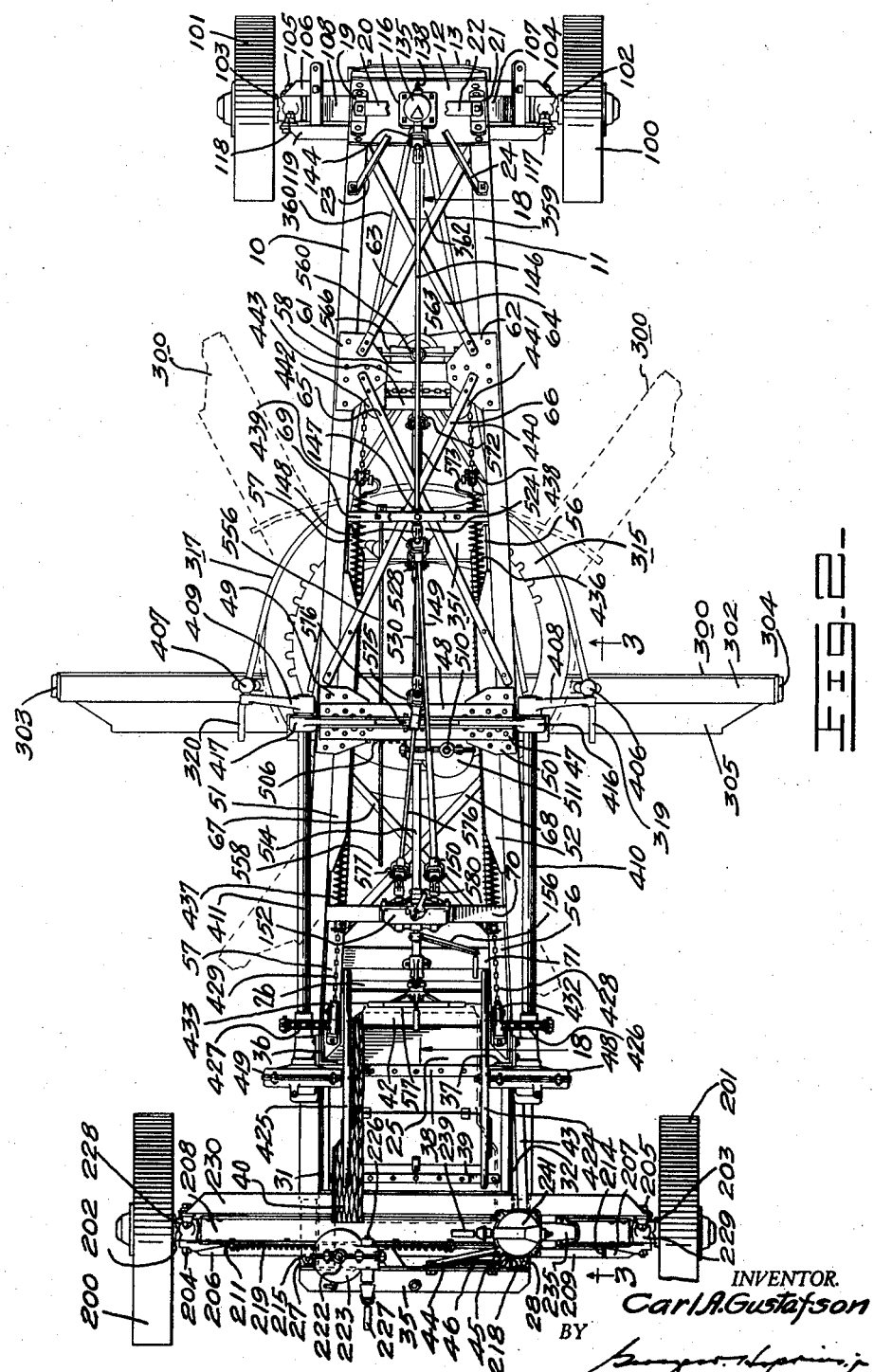

Feb. 6, 1940. C. A. GUSTAFSON 2,189,286
ROAD MACHINE
Filed April 27, 1931 15 Sheets-Sheet 3
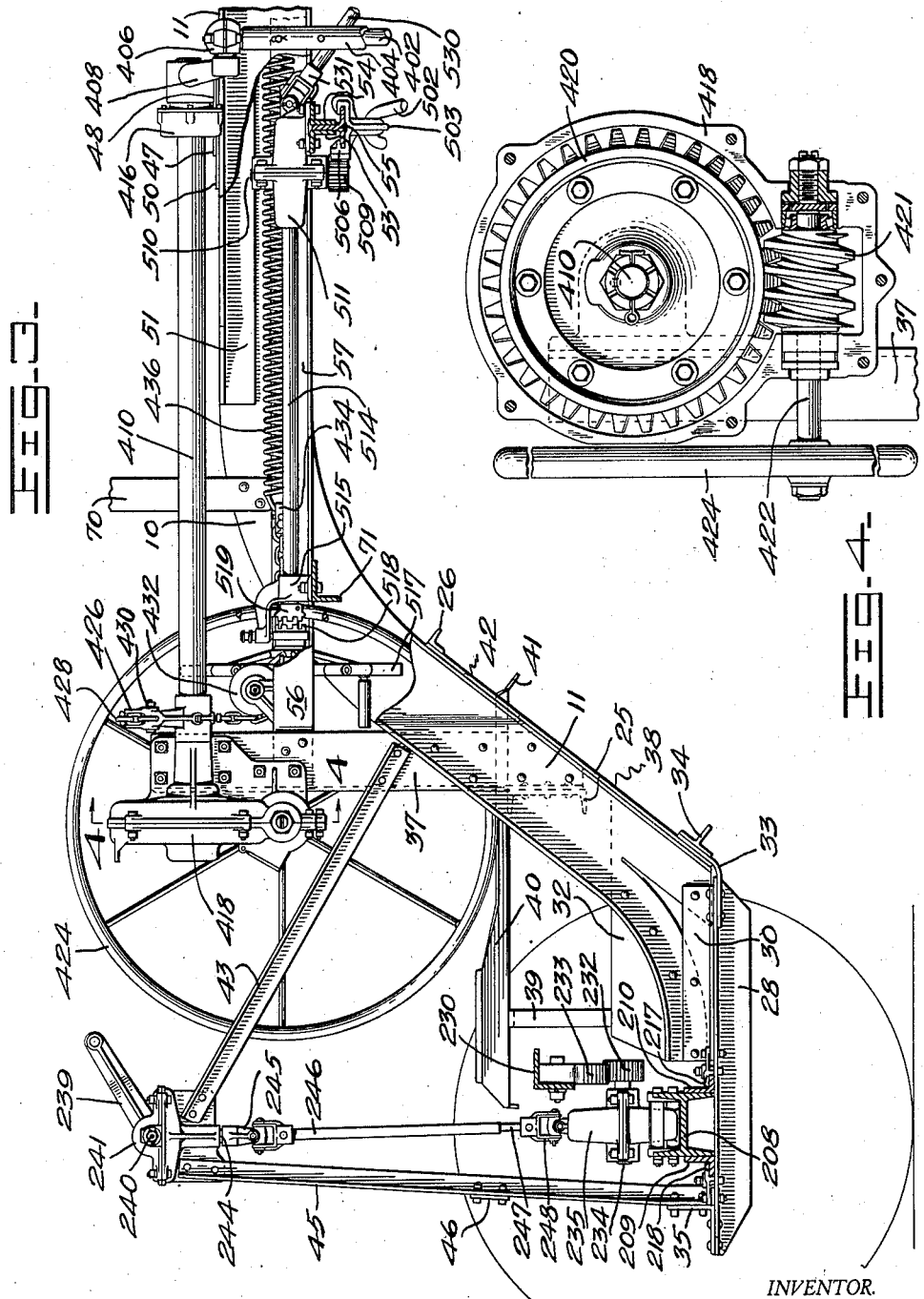
INVENTOR.
Carl A. Gustafson
BY
ATTORNEYS.

Feb. 6, 1940. C. A. GUSTAFSON 2,189,286
ROAD MACHINE
Filed April 27, 1931 15 Sheets-Sheet 4
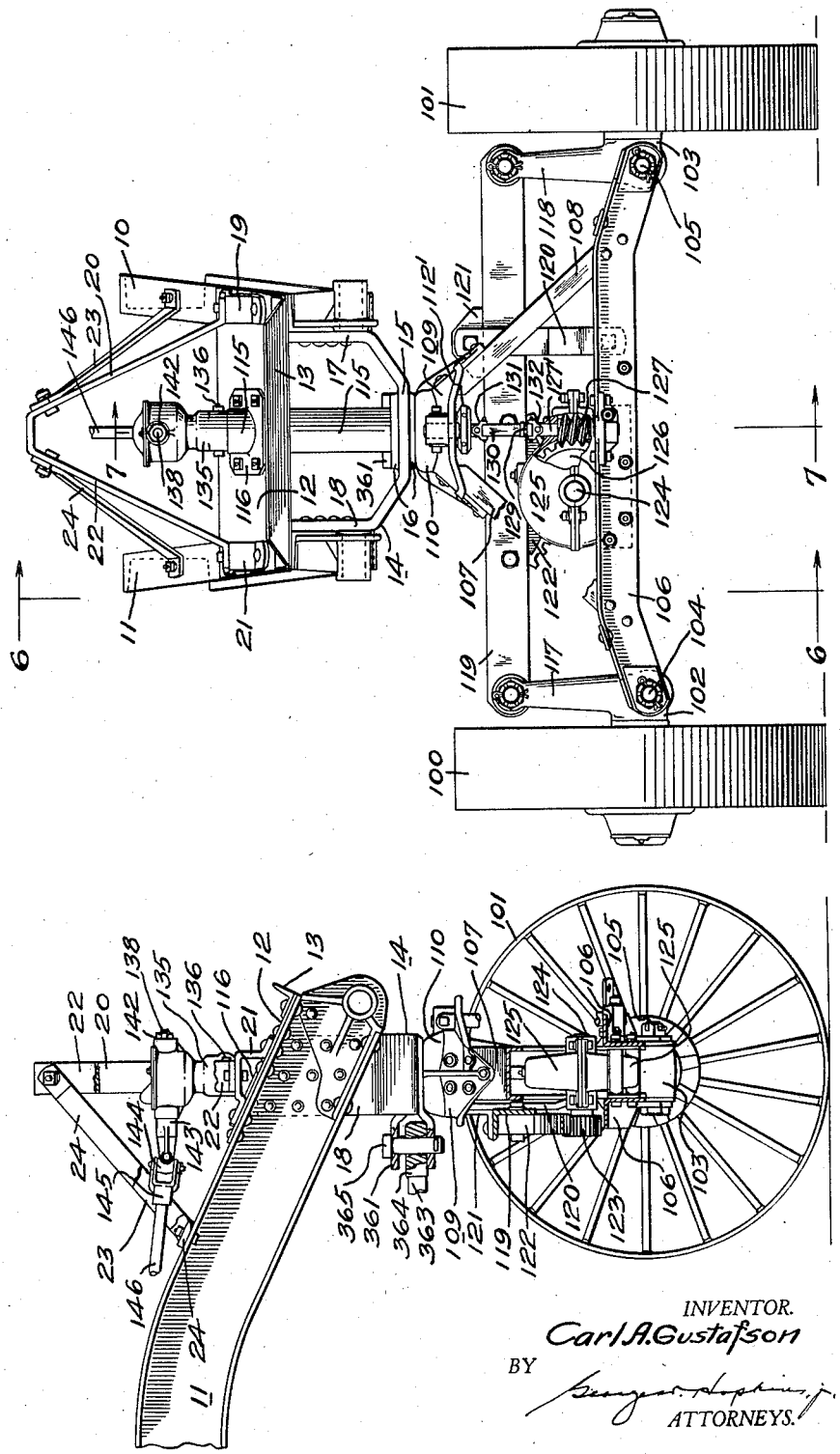

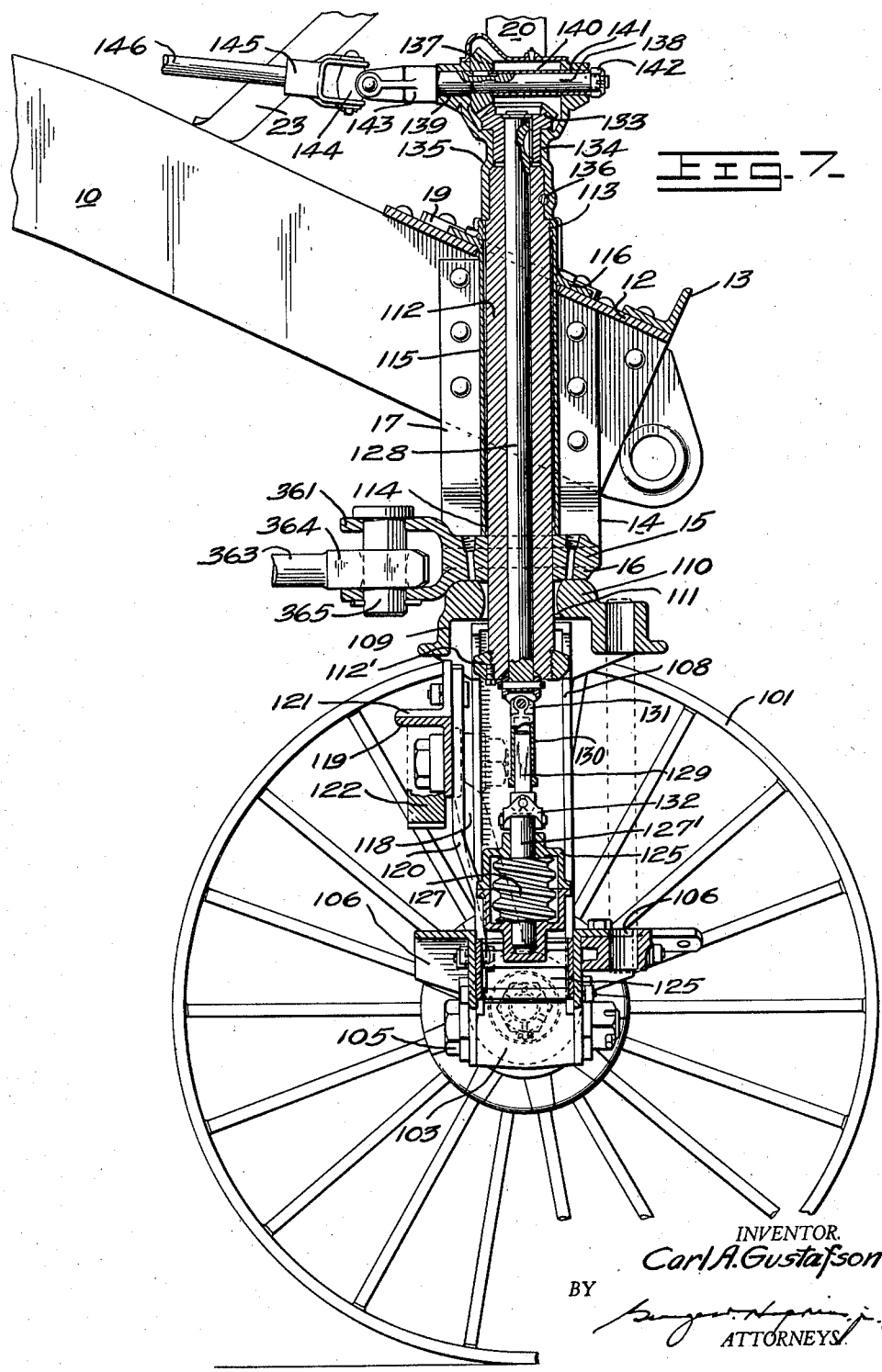

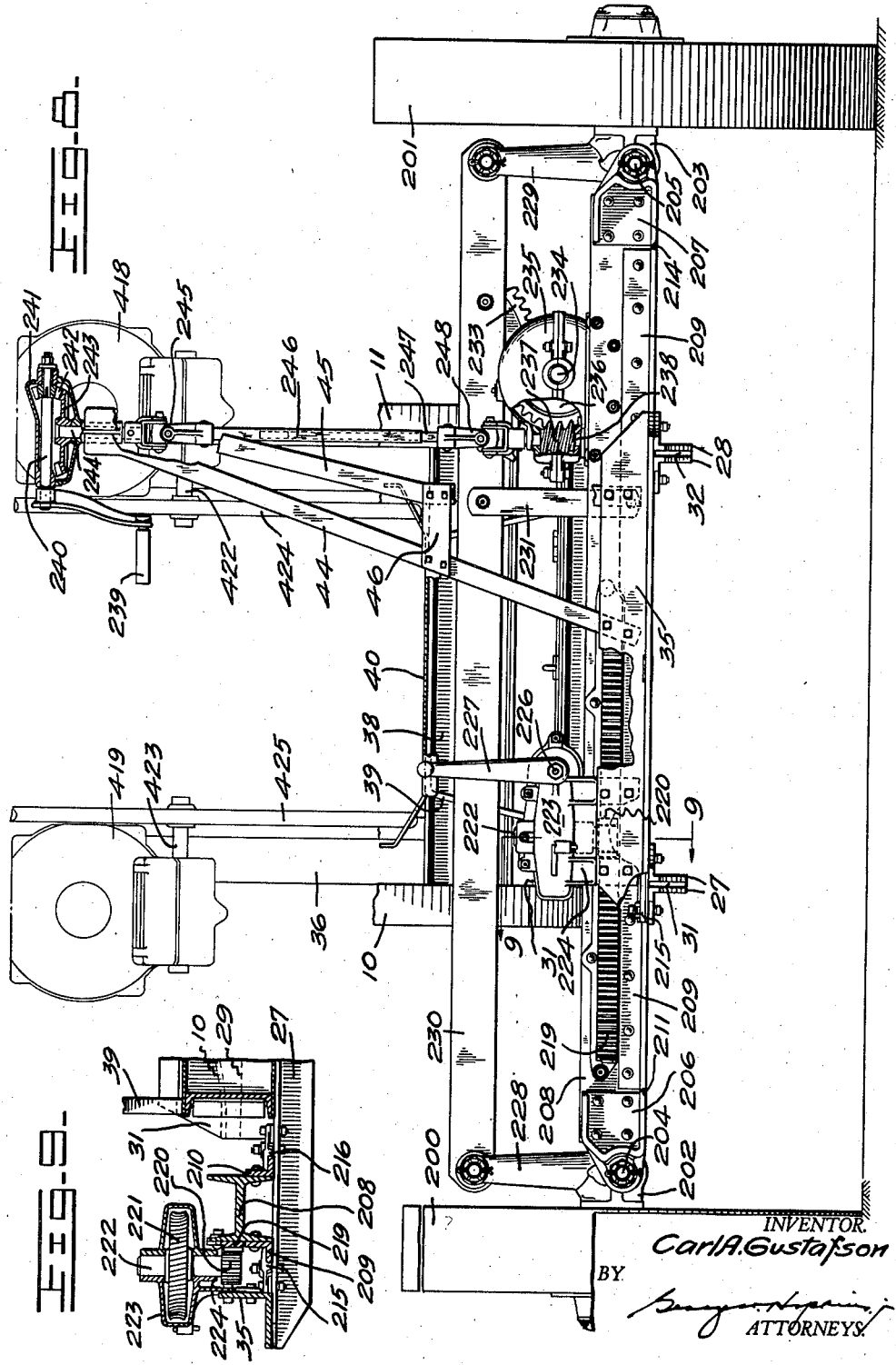

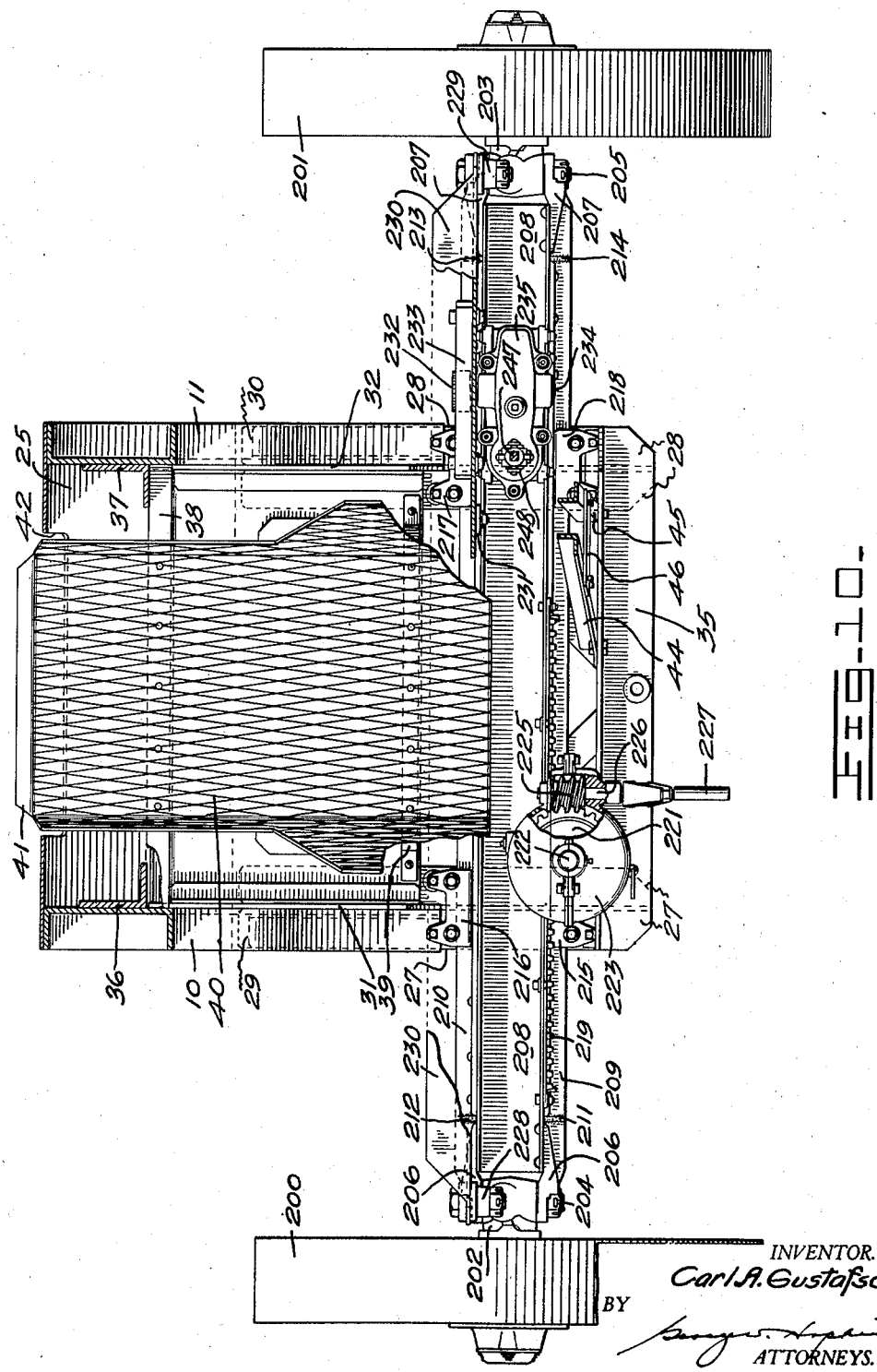

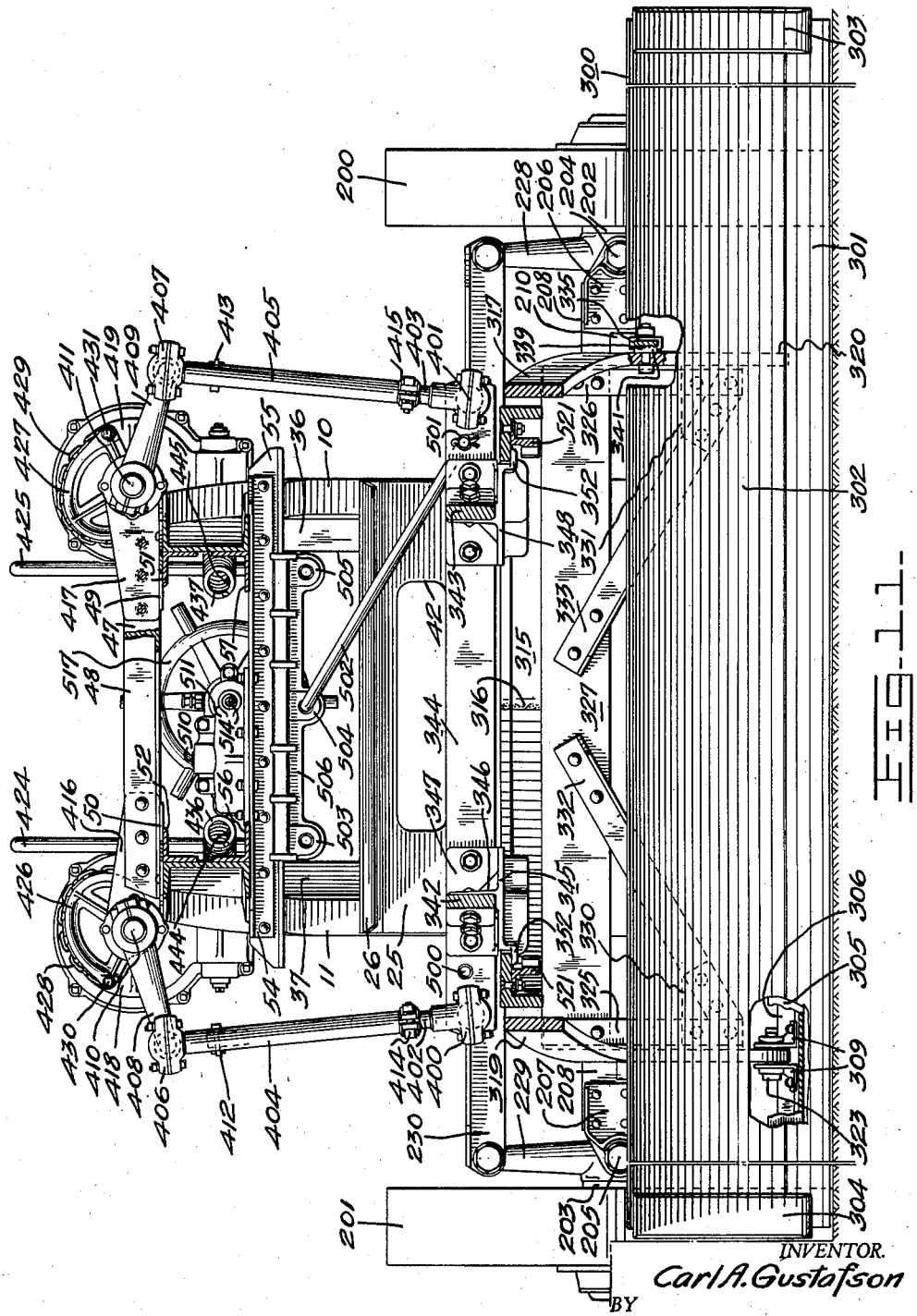

Feb. 6, 1940. C. A. GUSTAFSON 2,189,286
ROAD MACHINE
Filed April 27, 1931 15 Sheets-Sheet 9
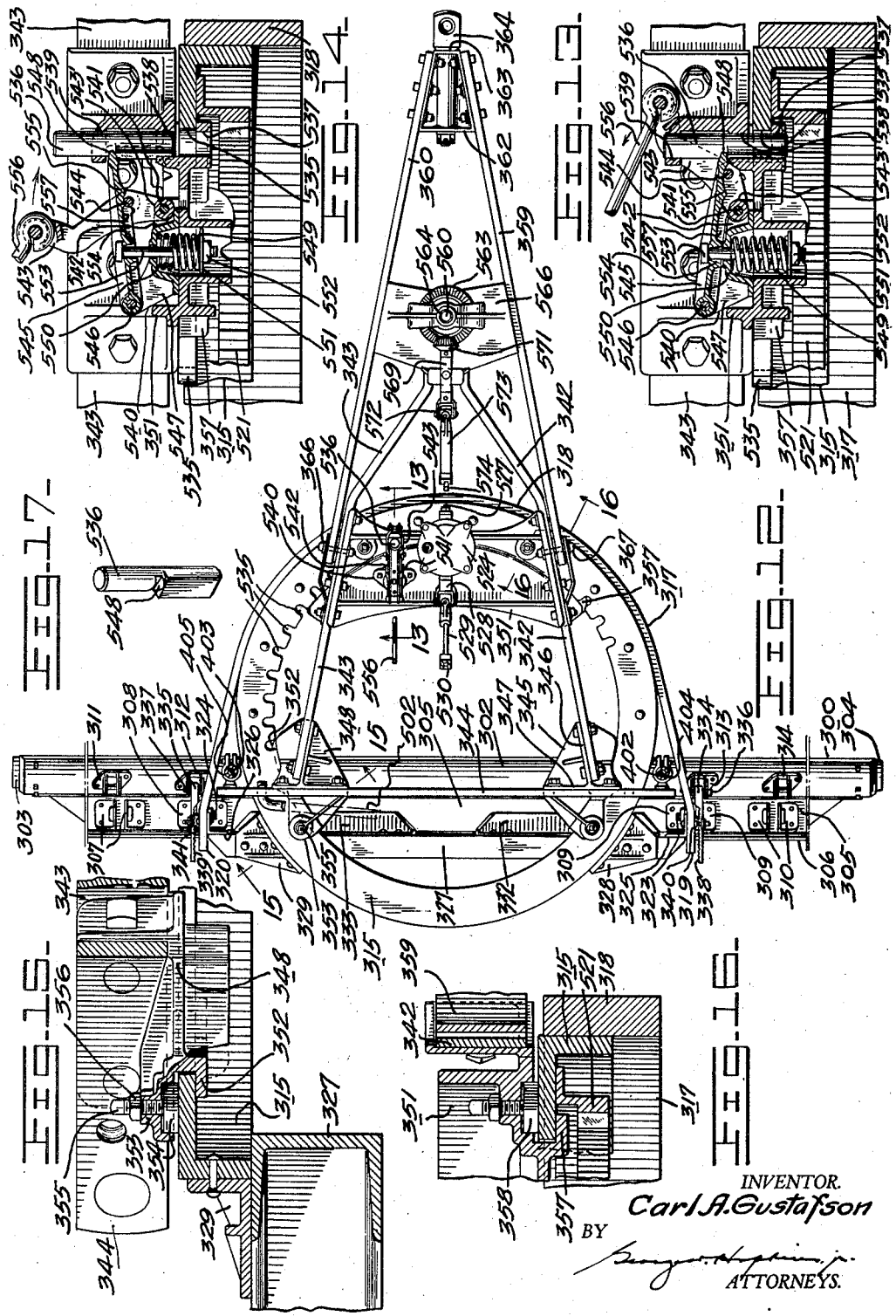
INVENTOR.
Carl A. Gustafson
BY
ATTORNEYS.

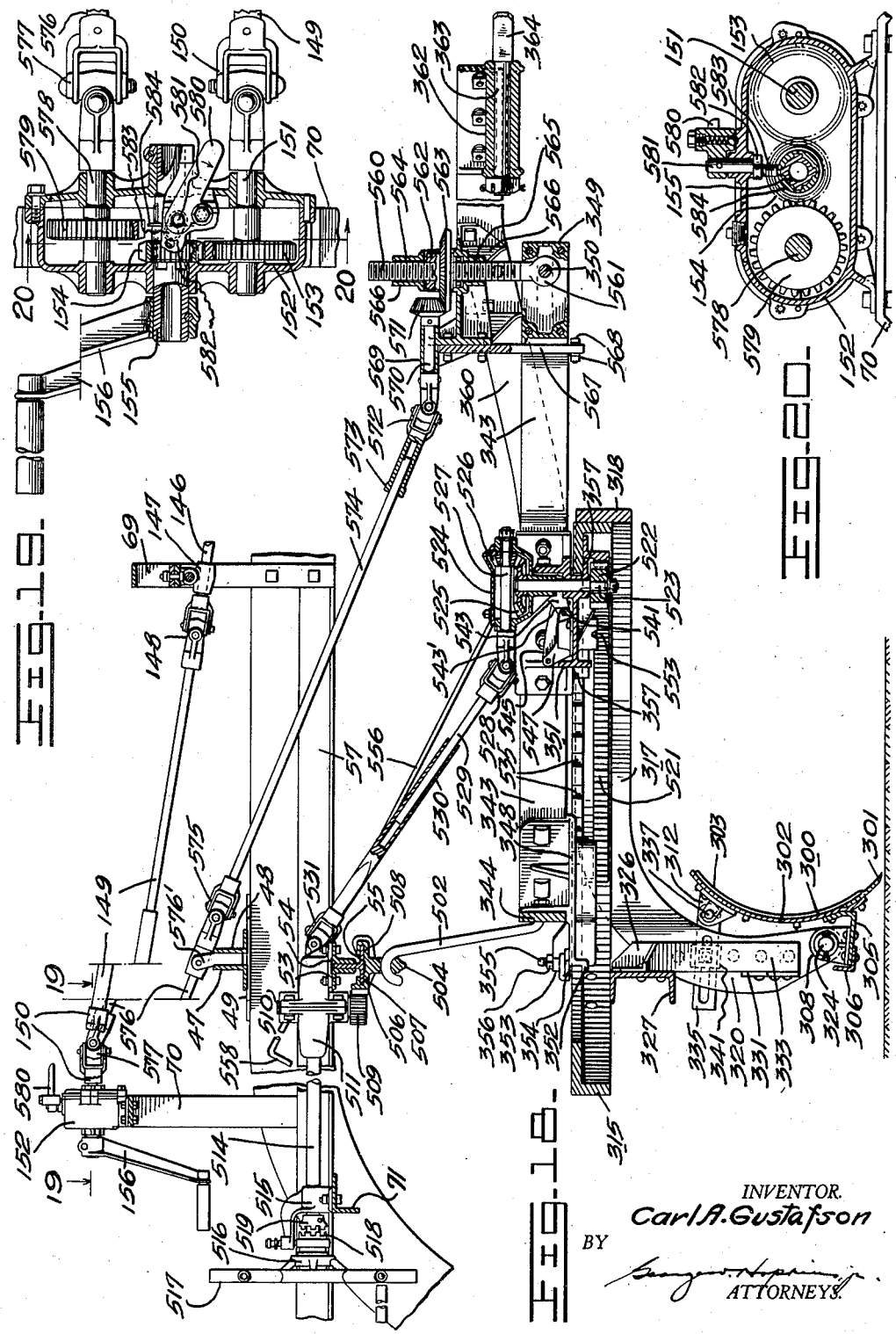

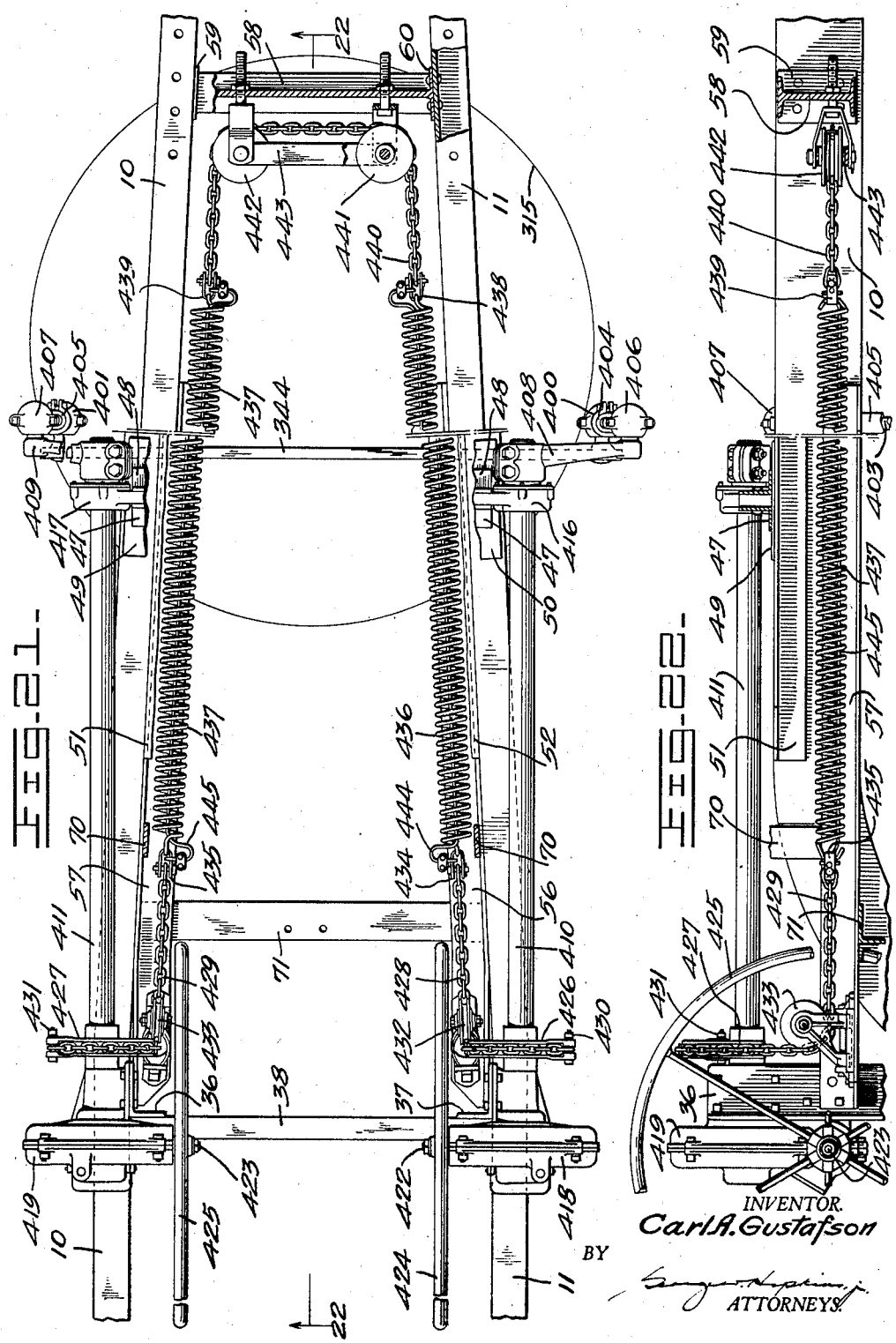

Feb. 6, 1940.    C. A. GUSTAFSON    2,189,286
ROAD MACHINE
Filed April 27, 1931    15 Sheets-Sheet 12
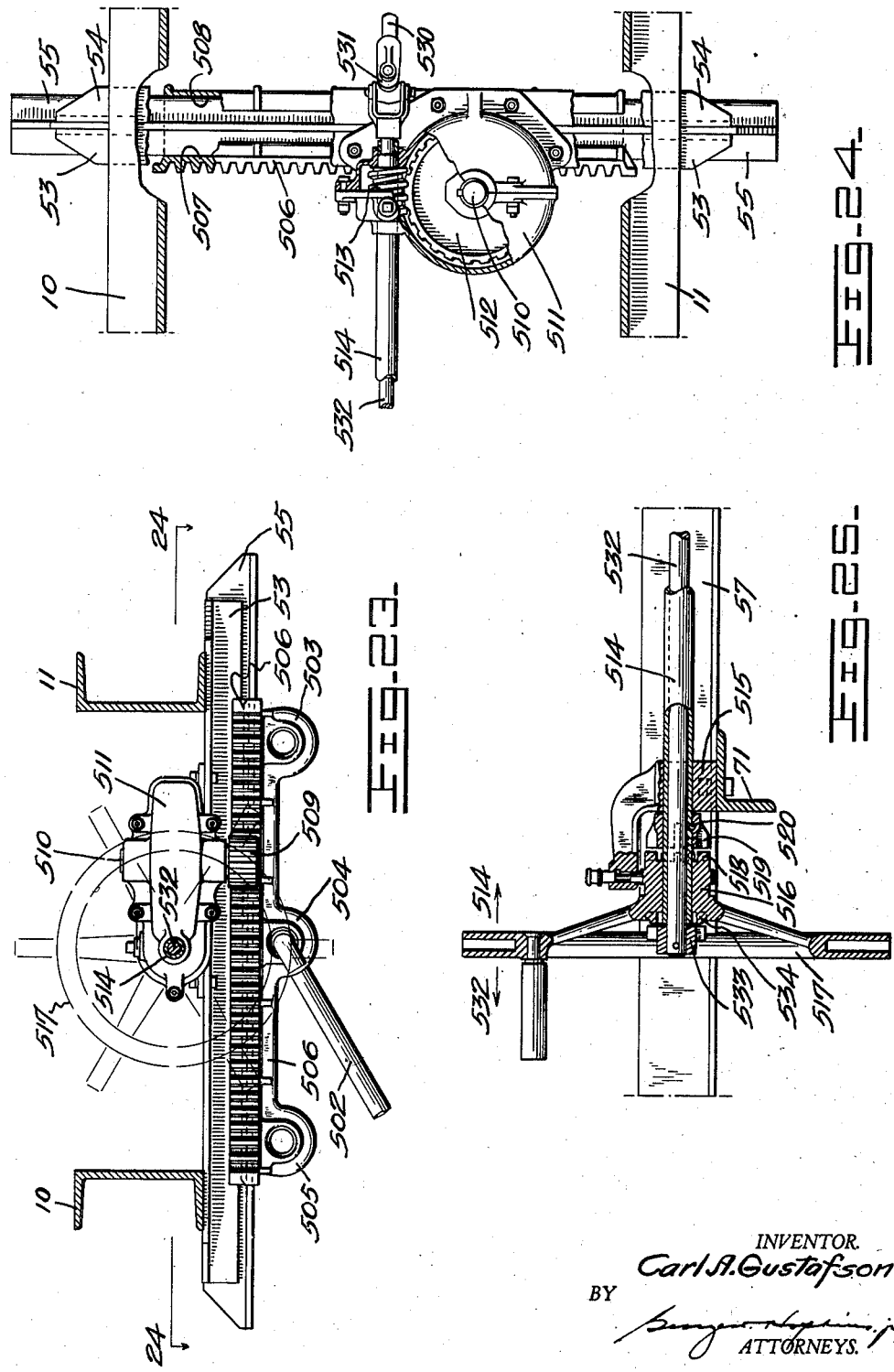

Feb. 6, 1940.   C. A. GUSTAFSON   2,189,286
ROAD MACHINE
Filed April 27, 1931   15 Sheets-Sheet 13

INVENTOR.
Carl A. Gustafson
BY
ATTORNEYS.

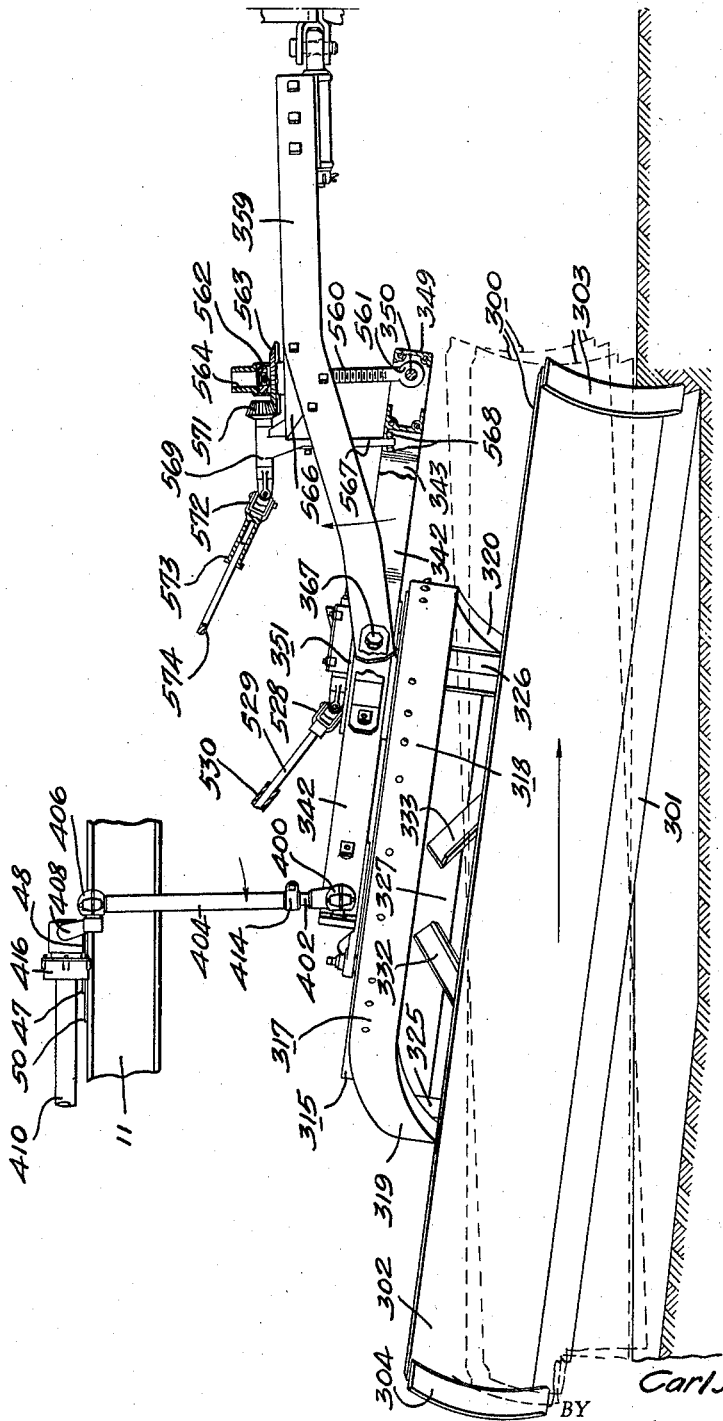

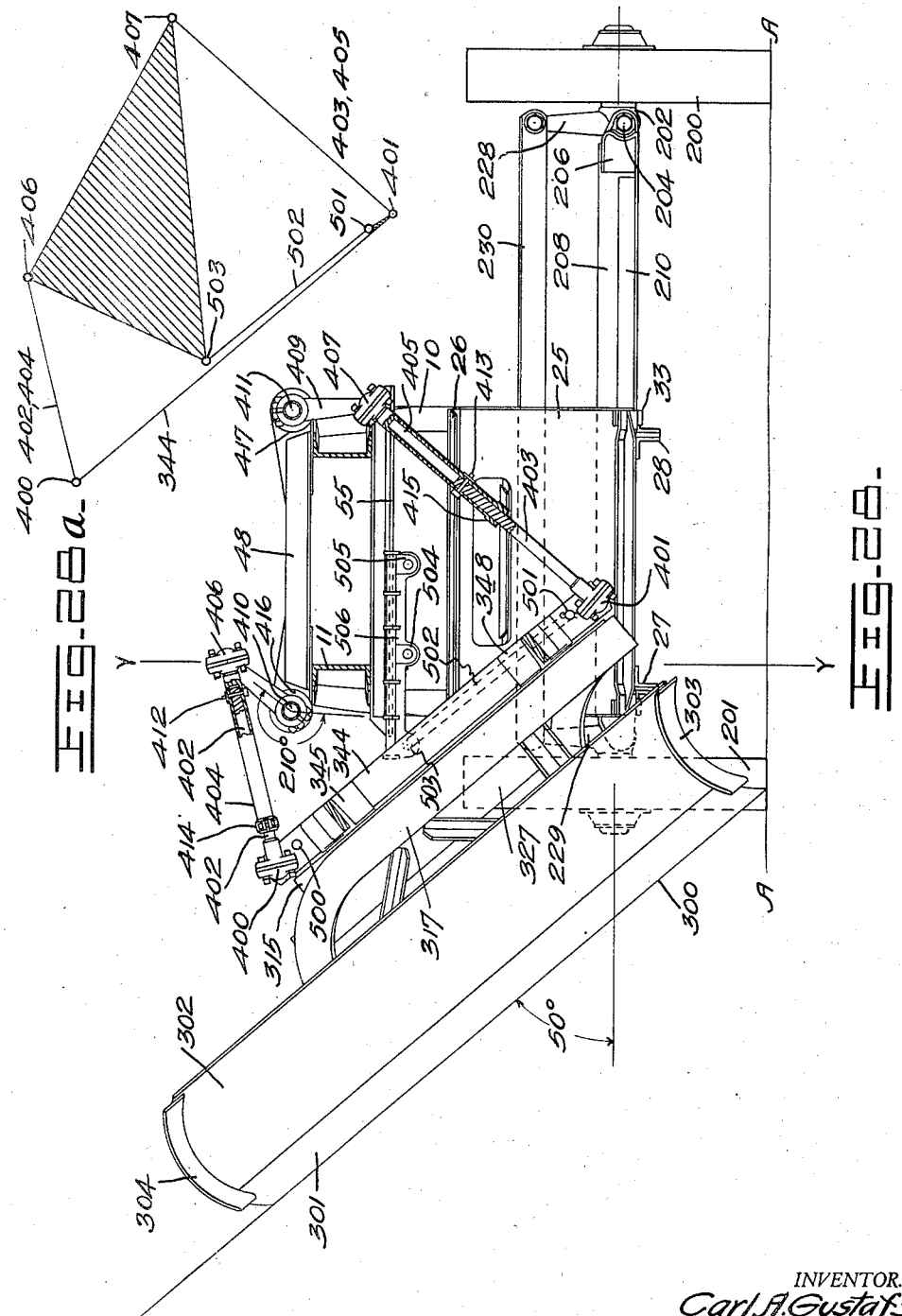

Patented Feb. 6, 1940

2,189,286

UNITED STATES PATENT OFFICE 2,189,286

ROAD MACHINE

Carl A. Gustafson, Minneapolis, Minn., assignor to Caterpillar Tractor Co., San Leandro, Calif., a corporation of California Application April 27, 1931, Serial No. 533,179

28 Claims. (Cl. 37—156)

My invention relates to road machines and particularly to graders. It is an object of the invention to provide an earth working machine in which the earth engaging tool is capable of a wide range of adjustments, is flexible in use and designed to be easily controlled by the operator.

Another object of the invention is to provide a road machine of improved construction and having an earth engaging tool adapted to be positioned to make a high-angle cut.

Another object is to provide a road machine having a plurality of adjusting means which are adapted to position an earth engaging tool to make a high-angle cut.

Another object is to provide a road machine having a plurality of adjusting means which are adapted to adjust an earth engaging tool to plowing position.

Another object of the invention is to provide a road machine having means for positioning an earth engaging tool to make a high-angle cut including means for adjusting the length of the supports for said tool.

Another object of the invention is to provide a road machine having means for positioning an earth engaging tool to make a high-angle cut including means for adjusting the length of the supports for said tool and means for equalizing the tension thereon in all positions thereof.

Another object of the invention is to provide a road machine having means for positioning an earth engaging tool to make a high-angle cut including means for connecting said tool to its supporting frame at a plurality of transverse positions with respect thereto.

Another object of the invention is to provide a road machine having means for positioning an earth engaging tool to make a high-angle cut including means for tilting the wheels with respect to the frame.

Another object of the invention is to provide a road machine having means for positioning an earth engaging tool to make a high-angle cut including means for adjusting a wheeled support transversely with respect to the road machine frame.

Another object of the invention is to provide a road machine having means for positioning an earth engaging tool to make a high-angle cut including means for varying the limits of transverse movement of said tool with respect to the frame of the machine.

Another object of the invention is to provide a road machine having means for positioning an earth engaging tool to make a high-angle cut including means for adjusting the angle of said tool with the line of draft and means for locking said tool in adjusted position.

Another object of the invention is to provide a road machine having means for positioning an earth engaging tool to make a high-angle cut including means for varying the angle between said tool and the draft connection therefor.

Another object is to provide an earth working machine having means for adjusting an earth engaging tool from a vertical depending position to an elevated position on either side of said machine.

Another object of the invention is to provide an earth working machine having means for adjusting an earth engaging tool to plowing position including means for lowering the front end of said tool.

Another object of the invention is to provide an earth working machine having a plurality of adjusting means for an earth engaging tool and a unitary, manually operable means for selectively controlling operation of said adjusting means.

Another object of the invention is to provide in a machine of the class described an improved locking means for an adjustable member.

Another object of the invention is to provide a road machine frame of sturdy construction which can be manufactured economically.

Another object of the invention is to provide a tool supporting circle of a simple and sturdy construction which can be readily formed at a small cost.

Another object of the invention is to provide an earth engaging tool which is adapted to act as a plow.

Other objects will appear as the description progresses.

Description of figures

Figs. 1 and 2 are general views of the machine.
Fig. 1 is a right side elevation.
Fig. 2 is a plan.
Fig. 3 is a side elevation of the rear end on line 3—3 of Fig. 2.
Fig. 4 is a section of a detail on line 4—4 of Fig. 3.
Figs. 5 to 7 illustrate the construction of the front end.
Fig. 5 is a front elevation.
Fig. 6 is a right side elevation from line 6—6 of Fig. 5.
Fig. 7 is a vertical longitudinal section on line 7—7 of Fig. 5.
Figs. 8 to 10 illustrate the construction of the rear end.

Fig. 8 is a rear elevation from line 8—8 of Fig. 1.

Fig. 9 is a section of a detail on line 9—9 of Fig. 8.

Fig. 10 is a horizontal plan from line 10—10 of Fig. 1.

Fig. 11 is a vertical transverse section of the machine on line 11—11 of Fig. 1 illustrating the circle lift and center shift.

Figs. 12 to 17 illustrate the circle supporting and locking mechanism.

Fig. 12 is a plan.

Fig. 13 is a section through the lock on line 13—13 of Fig. 12.

Fig. 14 is a similar view showing the circle unlocked.

Fig. 15 is a section through one circle support on line 15—15 of Fig. 12.

Fig. 16 is a section through another circle support on line 16—16 of Fig. 12.

Fig. 17 is a perspective view of the circle locking pin.

Fig. 18 is a vertical longitudinal section of the circle group with its controls, taken on line 18—18 of Fig. 2.

Fig. 19 is a horizontal section of a portion of the adjusting mechanism on line 19—19 of Fig. 18.

Fig. 20 is a transverse vertical section on line 20—20 of Fig. 19.

Figs. 21 and 22 illustrate the compensating spring lift mechanism.

Fig. 21 is a plan.

Fig. 22 is a vertical longitudinal section on line 22—22 of Fig. 21.

Figs. 23 to 25 illustrate the center shift mechanism.

Fig. 23 is a rear elevation from line 23—23 of Fig. 1.

Fig. 24 is a plan from line 24—24 of Fig. 23.

Fig. 25 is a vertical longitudinal section of the center shift control.

Fig. 27 is a diagrammatic illustration of blade adjustments obtained by varying the angle between the drawbars and the plane of the circle.

Fig. 28 is a diagrammatic illustration showing adjustment of the blade to a high bank sloping position by changing the lift link lengths and using the wide range center shift.

Fig. 28a is a diagram of the kinematic chain in Fig. 28.

DESCRIPTION OF MACHINE

Figure 26:
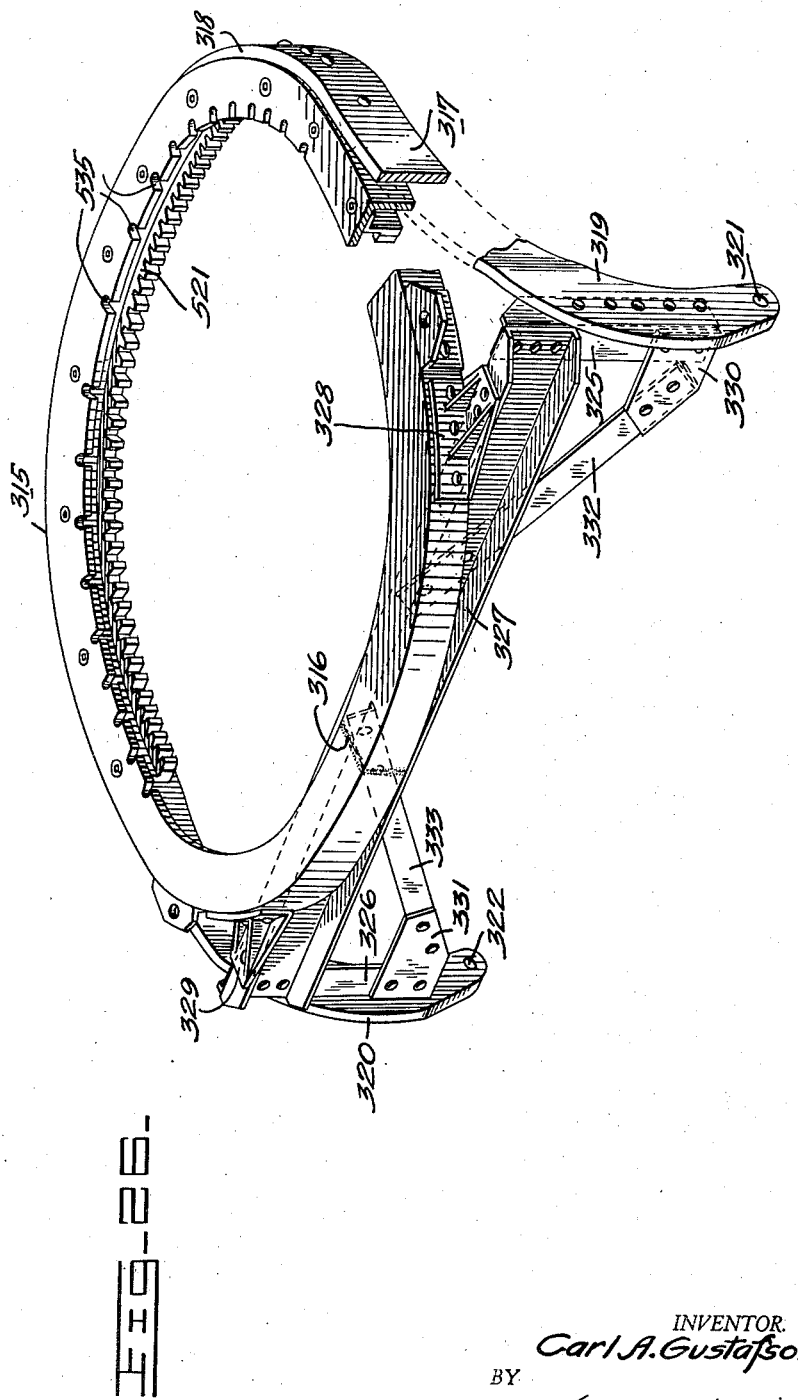
Fig. 26 is a perspective view of the circle assembly.

Frame (Sheets 1 to 8, 11, and 12)

The frame of the machine is substantially symmetrical with respect to the longitudinal axis, and includes two side channels 10, 11, which extend substantially the length of the machine and have a slight convergence toward the front end (Fig. 2). These side channels are interconnected by cross members and braces.

At the front end of the machine (Figs. 1, 2, 5, 6, 7) plate 12 is riveted to the forward ends of side channels 10, 11. Angle 13 at the front edge of plate 12 is riveted to plate 12 and to side channels 10, 11. Beneath plate 12 is bracket 14 having central horizontal portion 15 provided with boss 16, and having vertically extending portions 17, 18, which are riveted inside the forward ends of side channels 10, 11, respectively. A framework comprising members 19, 20, 21, 22, 23, 24, is secured to the front end of the frame as a support for a mechanism to adjust the line of draft of which only the parts mounted on the main frame are shown in the drawings.

At the rear end of the machine (Figs. 1, 2, 3, 8, 9, 10, 11) side channels 10, 11 are bent downwardly and rearwardly, and plate 25 is secured to their under sides. Upper edge of plate 25 is reinforced by angle 26. Pairs of angle extensions 27, 28 are secured to the ends of side channels 10, 11, respectively, by brackets 29, 30, respectively, by plates 31, 32, and by straps 33. T-bar 34 has its ends overlapping straps 33, and is secured to the lower edge of plate 25. To the rear ends of extensions 27, 28 is secured angle 35. Vertical posts 36, 37 are secured to the inner sides of side channels 10, 11, respectively, and serve to support a portion of the blade lifting mechanism. Channel 38 is secured to the lower ends of posts 36, 37, and in addition to reinforcing the framework serves in conjunction with inverted U-bracket 39 to support platform 40, the forward edge 41 of which extends through aperture 42 in plate 25. A framework, consisting of bar 43 secured to post 37, bars 44, 45 secured to angle 35 and interconnected by strap 46, supports part of the mechanism for tilting the rear wheels.

In the central portion of the machine above the blade (Figs. 2, 3, 11, 23, 24) the ends of a pair of spaced apart angles 47, 48 are secured to the top faces of side channels 10, 11 and the connections are reinforced by gussets 49, 50 and angles 51, 52. Angles 47, 48 also serve to support part of the blade lifting mechanism. The ends of a pair of spaced apart angles 53, 54 are secured to the bottom faces of side channels 10, 11 beneath angles 47, 48; the central web of T-bar 55 is interposed between angles 53, 54 and is secured thereto. Angles 53, 54 and T-bar 55 support the center shift mechanism. The central portion of side channels 10, 11 are further reinforced by angles 56, 57 which are secured to the inner lower edges thereof and extend rearwardly to posts 36, 37 to which they are also secured.

Intermediate the front end and the central cross members (Figs. 1, 2, 21, 22) is cross member 58 which is fabricated, having a substantially I-beam cross section and end flanges 59, 60 for securing it to side channels 10, 11. The connections of cross member 58 with the side channels is reinforced by gussets 61, 62. Cross member 58 also serves as a support for part of the compensating spring mechanism.

To obtain rigidity and to prevent weaving, diagonal braces 63, 64, 65, 66, 67, 68 are employed, as shown in Fig. 2. Cross pieces 69, 70, 71 are connected to side channels 10, 11 to provide supports for adjusting mechanisms.

Front wheels (Sheets 4, 5 and 10) (100 series numerals)

Front wheels 100, 101 (Fig. 5) are journaled on spindles which are integral with bell cranks 102, 103, pivoted at 104, 105, in angles 106 (Fig. 6) which comprise the front axle. Upwardly converging channels 107, 108 are secured at their lower ends to angles 106 and at their upper ends to casting 109, having boss 110 (Fig. 7) apertured at 111 and contacting the under side of boss 16 in the horizontal portion 15 of frame bracket 14.

Hollow kingbolt 112 passes through aperture 111 and is supported in boss 16 through which it passes, and at 113, 114 in housing 115 which is provided with flange 116 for attachment to plate 12 of the main frame. Nut 112' is threaded to the lower end of kingbolt 112 and is adapted to be locked thereon. The front axle and wheels pivot on the vertical axis of the kingbolt.

The front wheels can be tilted with respect to the front axle by rocking bell cranks 102, 103 (Fig. 5) on their pivots 104, 105. For this purpose the upstanding arms 117, 118 of bell cranks 102, 103 are pivotally connected to shift bar 119. Movement of shift bar 119 will impart equiangular oscillations to the bell cranks. To facilitate operation of shift bar 119, a strap 120 is pivotally connected to axle 106 and lug 121 secured to the shift bar.

To operate shift bar 119, sector 122 is secured thereto and meshes with pinion 123 (Fig. 6) on shaft 124 journaled in housing 125 and provided with worm gear 126 (Fig. 5) which is rotated by worm 127 on shaft 127', also journaled in housing 125. Housing 125 has a portion which extends downwardly to fit between angles 106 to which it is secured by bolts.

Shaft 128 (Fig. 7) passes through hollow kingbolt 112 and is operatively connected to worm 127 by an extensible driving connection comprising square shaft 129 telescopically engaging within hollow square sleeve 130. Sleeve 130 has a universal connection 131 with shaft 128, and shaft 129 has a universal connection 132 with worm shaft 127'. Rotation of shaft 128 effects rotation of worm 127, worm wheel 126, shaft 124, pinion 123, to shift bar 119 to tilt the wheels. The extensible universal connection between shaft 128 and worm 127 enables the shift bar to be operated in all positions of the wheels and axle.

Shaft 128 (Fig. 7) has bevel gear 133 keyed to its upper end and retained thereon. Bevel gear 133 is journaled at 134 in housing 135 which fits the reduced upper end portion of kingbolt 112 and is secured thereto by means of lock bolt 136. Bevel gear 133 is driven by bevel pinion 137 keyed to shaft 138 which is journaled at 139 in housing 135 and is provided with sleeve 140 received in housing 135 at 141. Shaft 138 is retained in place in housing 134 by means of nut 142 and yoke 143, which is secured to shaft 138 and forms part of universal joint connection 144, the other yoke 145 of which is secured to shaft 146. The rear end of shaft 146 is supported at 147 (Fig. 18) in support 69, where it is connected by universal joint 148 to telescopic shaft 149 which is connected by universal joint 150 to stub shaft 151 (Fig. 19) journaled in housing 152 secured to support 70. Within housing 152, shaft 151 has secured thereto gear 153 which is adapted to be driven by pinion 154 splined on sleeve 155 to which operating crank 156 is secured. Pinion 154 is adapted to be driven by sleeve 155 and to be axially adjusted thereon for a purpose hereinafter described. When pinion 154 is in mesh with gear 153, rotation of crank 156 causes tilting of the front wheels.

*Rear wheels (Sheets 3, 6 and 7)*
*(200 series numerals)*

Rear wheels 200, 201 (Fig. 8) are journaled on spindles integral with bell cranks 202, 203 pivoted at 204, 205 in brackets 206, 207 (Fig. 10) secured to the ends of I-beam 208. Angles 209, 210 are riveted along the lower outside edges of I-beam 208 and are joined at their ends 211, 212, 213, 214 to brackets 206, 207 by welding to provide continuous flanges along the bottom edges of the axle for cooperation with guides 215, 216, 217, 218 on main frame extensions 27, 28.

Rear axle 208 is transversely adjustable with respect to the main frame. For this purpose, rack 219 (Fig. 9) is secured to the rear face of I-beam 208 and pinion 220 is arranged to mesh therewith. Pinion 220 is operated in unison with worm gear 221. Shaft 222 on which they are secured is journaled in housing 223 which has a depending portion 224 secured to the upstanding web of frame angle 35. Worm gear 221 (Fig. 10) is driven by worm 225. Worm shaft 226 is journaled in housing 223 and is operated by crank 227. Axle 208 can be shifted transversely of the main frame by operation of crank 227.

The rear wheels can be tilted with respect to the rear axle. For this purpose, the upstanding arms 228, 229 (Fig. 8) of bell cranks 202, 203 are interconnected by shift bar 230 which is guided by strap 231 and shifted by pinion 232 (Fig. 3) and sector 233, the latter being secured to bar 230. Pinion shaft 234 is journaled in housing 235 within which worm gear 236 (Fig. 8) is secured to the shaft. Worm 237 meshes with worm gear 236 and worm shaft 238 is also journaled in housing 235. Rotation of worm 237 causes bar 230 to be shifted to tilt the wheels with respect to the axle.

Worm 237 is operated by crank 239 whose shaft 240 is journaled in housing 241 supported on framework 43, 44, 45. Secured to shaft 240 within housing 241 is bevel pinion 242 which drives gear 243, the latter being secured to a short vertical shaft 244, the lower end of which is connected by universal joint 245 to square hollow sleeve 246 within which is received square shaft 247, the lower end of which is connected by universal joint 248 to worm shaft 238. Rotation of crank 239 results in tilting the wheels, and due to the extensible universal joint connections between shaft 244 and shaft 238, the wheels can be tilted by crank 239 in any position of the wheels or axle.

*Blade and circle (Sheets 5, 8, 9, 10, and 13) (300 series numerals)*

Blade 300 (Fig. 18) consists of cutting edge 301 secured to moldboard 302 and end bits 303, 304 (Fig. 11) secured to moldboard 302 and overlapping cutting edge 301. Angle bracket 305 (Fig. 18) is secured to moldboard 302 and angle 306 is secured to the trailing edge of angle 305. Brackets 307, 308, 309, 310 (Fig. 12) are secured to angle bracket 305. Corresponding brackets 311, 312, 313, 314 are secured to moldboard 302. Brackets 307—314 are used for connecting the blade to the circle assembly in different positions.

Circle 315 (Fig. 26) is made of a single piece of angle bent into a circle with the ends joined by welding at 316. Beam 317 has a central portion 318 which is bent into a semi-circle of substantially the same radius as the circle. This central semi-circular portion of the beam encompasses approximately one-half of the circle and is riveted thereto. End portions 319, 320 of beam 317 extend tangentially from the circle and downwardly, their lower ends being apertured at 321, 322 for connection to the brackets on angle 305 by means of pins 323, 324. In order to rigidly connect the ends of the beam to the circle, brackets 325, 326 are riveted to end portions 319, 320. The upper ends of the brackets 325, 326 are riveted to the ends of channel 327 which is rigidly connected to circle 315 by brackets 328, 329. In addition, the lower end of brackets 325, 326 are rigidly secured by gussets 330, 331 to the lower ends of inclined braces 332, 333, the inner ends of which are riveted to channel 327.

The blade 300 is angularly adjustable about the axis of pins 323, 324 (Fig. 18) to alter the inclination of cutting edge 301 to the surface of the ground. To lock the blade in adjusted position, links 334, 335 (Figs. 12 and 18) are connected by pins 336, 337 to the brackets on the moldboard. The inner faces of links 334, 335 are serrated at 338, 339 to engage with corresponding serrations in clamping blocks 340, 341 on the beam. A plurality of brackets 307 to 314 is provided so that the blade may be connected to the beam in different transverse positions with respect to the surface so that the blade can be made to extend farther outwardly to the left or right of the machine as desired. There are two pairs of these brackets which do not appear in Fig. 12 because they are beneath the circle.

The circle is revolvably mounted in a framework (Fig. 12) consisting of forwardly converging side bars 342, 343 and rear cross bar 344. The rear end of side bar 342 is rigidly connected with the right end of bar 344 by bracket 345 to the webs 346, 347 of which they are bolted. Similarly the rear end of side bar 343 is rigidly connected with the left end of bar 344 by bracket 348. The front ends of the side bars are secured to a hollow connection block 349 (Fig. 18) in which is pin 350 for a purpose hereinafter described. The intermediate portions of the side bars are rigidly connected together by casting 351 (Fig. 12). The inwardly extending flange of the circle rests on an arcuate ledge 352 (Fig. 15) which is formed integrally with bracket 348, and above the rear end of ledge 352 a portion of the bracket is extended over the inwardly projecting flange of the circle where it is provided with a boss 353 adapted to receive a rub iron 354 and an adjusting screw 355 therefor, which is threaded in boss 353 and provided with lock nut 356. The arcuate ledge provides a support for the circle on which the circle can be revolved and the rub iron serves to take up wear in the parts and to reduce the amount of play between the circle and the support. Bracket 345 is similarly equipped. Likewise, a ledge 357 (Fig. 16) is provided under the front right corner of casting 351 to support circle 315 and an adjustable rub iron 358 is associated therewith. The casting is similarly constructed at the left front corner. Thus, four arcuate ledges, arranged in a circle, are provided on the circle supporting framework which permit the circle to be revolved thereon, and there is an adjustable rub iron associated with each support.

The circle supporting framework is connected by drawbars 359, 360 (Figs. 12 and 18) to the front end of the main frame (Fig. 7) where horizontal portion 15 of U-bracket 14 has a rearwardly extending fork 361 secured thereto. Drawbars 359, 360 converge forwardly to a connection 362 to which they are bolted. In connection 362 is a bolt 363 having an apertured head 364 which is connected by pin 365 in fork 361. Bolt 363 can swing in a horizontal plane about the vertical axis of pin 365, and, due to the rounded edges of the aperture in the head 364 and the wide spacing of the jaws of the fork 361, bolt 363 is capable of a limited oscillation in the vertical plane, as well. The rear end of drawbar 360 is pivotally connected to the circle supporting framework at 366 (Fig. 12) and the rear end of drawbar 359 is pivotally connected thereto at 367. By reason of these pivotal connections between the drawbars and the circle supporting framework, the framework, together with the circle and the blade, can be raised and lowered with respect to the drawbars, or, in other words, the angle between the drawbars and the plane of the circle can be varied. Also, the drawbars, together with the circle and blade assembly, as a unit, are capable of a limited universal movement about the intersection of the axes of pin 365 and bolt 363 as a center.

To summarize the movements of adjustment of which the circle is capable, they are, an arcuate movement in a horizontal plane about the vertical axis of pin 365; an arcuate movement in vertical planes containing the axis of pin 365; oscillation about the axis of bolt 363; a jack-knife movement between the circle and the drawbars; and oscillation of the circle about its center. The desired circle adjustment is usually obtained by combinations of these movements.

*Blade lift (Sheets 3, 8, 11 and 15) (400 series numerals)*

The ends of rear cross bar 344 (Fig. 11) of the circle supporting framework are connected by ball and socket joints 400, 401 to links 402, 403 in the form of elongated rods which telescope in links 404, 405 in the form of elongated tubular members which are connected by ball and socket joints 406, 407 to lift or crank arms 408, 409, secured to the forward ends of shafts 410, 411. Links 402, 404 and 403, 405 are provided with spaced apertures to receive pins 412, 413 by means of which the telescoping links can be secured together at the desired length. In addition, link 404 can be secured to link 402 by clamp 414, and link 405 can be secured to link 403 by clamp 415. The link connections between the ends of bar 344 and lift arms 408, 409 are adapted to be adjusted at different lengths for a purpose hereinafter described. The forward ends of shafts 410, 411 are supported in bearing brackets 416, 417 which are supported from the main frame by means of portions integral therewith which extend inwardly between the upstanding flanges of angles 47, 48 and which are riveted thereto. The rear ends of shafts 410, 411 (Figs. 3 and 4) are supported in bearings in housings 418, 419 which are secured to posts 37, 36. The rear end of shaft 410 has worm gear 420 secured thereto within housing 418, and worm gear 420 is adapted to be driven by worm 421 on worm shaft 422 which is journaled in housing 418. Worm shaft 422 extends inwardly to receive operating wheel 424. Likewise, shaft 411 is operated by wheel 425 on worm shaft 423 which through its worm drives a worm wheel on the rear end of shaft 411.

By manipulation of wheels 424, 425 the operator is enabled to raise or lower either end of bar 344. By reason of the fact that shafts 410, 411 at the points at which arms 408, 409 are connected thereto extend outside the main frame (Fig. 28), each of the arms 408, 409 is capable of assuming a substantially vertically depending position. Due to the fact that the links 402, 404 and 403, 405 are adjustable, the angle of inclination of the circle and blade to the wheels-ground-contacting plane, A—A, can be further increased. The blade can also be adjusted on the other side of the machine, and to permit this adjustment, links 402, 404 are extended and links 403, 405 are shortened.

To facilitate operation of a lifting mechanism capable of adjusting the heavy circle and blade assembly to these extreme angles of inclination, a spring lift compensator is employed. Grooved cams 426, 427 (Figs. 11, 21 and 22) are secured to shafts 410, 411 to rotate therewith.

The ends of chains 428, 429 are secured by bolts 430, 431 at the outer ends of the grooves in cams 426, 427. Sheaves 432, 433 are supported by arms pivoted in brackets secured to angles 56, 57. Chains 428, 429 pass over cams 426, 427 and down under sheaves 432, 433, from which point they extend forwardly to clevises 434, 435 by which they are connected to the rear ends of springs 436, 437, the forward ends of which are connected by clevises 438, 439 to the ends of chain 440 which passes around sheaves 441, 442. These sheaves are journaled in bracket 443 which is secured to cross member 58. Clevises 434, 438 are interconnected by safety cable 444, and clevises 435, 439 are interconnected by safety cable 445. These cables prevent the springs from flying in the air if they break. By reference to Fig. 11, it will be seen that the cams are so proportioned and arranged on the shafts that as the arm moves from the vertical depending position to the horizontal position, the leverage of the cam is increasing, that is, the radii from the shaft center to the cam surface increase in length with the angle of lift. The cam profile is designed to maintain torsional balance in the shaft. While the lift arm radius is constant and the lift force along the axis of the link may in the case of a straight vertical lift be considered substantially constant, the moment about the axis of the shaft increases as the arm moves from the vertical depending position to the horizontal. The counter-balancing moment of the spring around the same axis is increased accordingly by increasing the length of the arm by the cam profile. Lifting the arm above the horizontal in the case of a substantially vertical lift results in shortening of the moment arm and the corresponding part of the cam is developed with diminishing radii. However, while the tensions in the lifting links are substantially equal for vertical lift of the blade when the blade is positioned directly under the machine, when the blade is swung to the side of the machine to obtain a steep angle of inclination to the ground as shown in Fig. 28, the link tensions are unbalanced and the moments of lift on the shafts are not equal. Under these circumstances, equilibrium is nevertheless obtained because the springs of the equalizer are interconnected. In fact, the two lift arm shafts are in effect interconnected through the equalizer springs so that the combined spring tension is available for both shafts.

*Circle Shift (Sheets 1, 8 to 10, and 12 to 16) (500 series numerals).*

Means are provided for (1) shifting the center of the circle transversely of the machine or about the center of pin 365; (2) shifting the circle on its own center, and (3) adjusting the plane of the circle with respect to the drawbars.

(1) For shifting the center of the circle, the supporting frame of the circle is adapted to be variously connected by a link to a rack on the main frame which can be slid transversely of the main frame. Rear cross bar 344 (Fig. 11) of the circle supporting framework is provided with apertures 500, 501 adjacent its ends for connection to a link 502 having a hooked end for connection with apertured lugs 503, 504, 505 depending from rack 506 which has channels 507, 508 (Fig. 18) formed integrally therewith for engagement with the flanges of T-bar 55, which, as explained before, is secured to the main frame. Rack 506 is adapted to slide along bar 55 and for this purpose is engaged with pinion 509 (Fig. 23) on shaft 510, journaled in housing 511. Keyed to shaft 510 within housing 511 (Fig. 24) is worm gear 512 which is driven by worm 513 on hollow shaft 514, also journaled in housing 511. The rear end of hollow shaft 514 (Fig. 25) is supported in bracket 515 which is secured to cross member 71 in the main frame. The hub 516 of hand wheel 517 is loosely journaled on the rear end of hollow shaft 514. The forward end of hub 516 is formed as a clutch element 518 which is adapted to be engaged with a clutch element 519 secured by pin 520 to hollow shaft 514 by sliding hand wheel 517 and hub 516 in the direction of arrow 514. For normal operation, the center shift mechanism is adjusted as illustrated in Fig. 11 with link 502 engaged with the central apertured lug 504 on rack 506, and with the other end of link 502 engaged with either aperture 500 or aperture 501 in bar 344 depending on the angular adjustment of the circle itself; that is, depending on the angle of the cutting edge with respect to the longitudinal axis of the machine. Hand wheel 517 can be operated to shift rack 506 toward either side of the machine, thereby shifting the center of the circle to extend the blade farther out on either side. By engaging link 502 with lugs 503 or 505, the range of center shift can be further increased, so that a plurality of ranges of center shift are obtained with a single rack. This arrangement is necessary (Fig. 28) to shift the center of the circle well to one side of the machine to obtain extreme angles of inclination of the blade. With the blade inclined at approximately 50° to the axis of the rear wheel, almost the entire blade assembly is outside the vertical plane of the side of the frame, as indicated by the line Y—Y. The lift links alone could not maintain the blade and circle in this position because of their pivotal connection with the circle supporting frame and the lift arms; but, by the addition of the center shift link connection, the chain of linkage comprising (Fig. 28a) the main frame (represented by triangle 406, 407, 503), link 403, 405, link 344 (with which the circle and blade are a unit), link 402, 404, and link 502, is a locked kinematic chain. Link 402, 404 is pivoted to the frame at 406; link 403, 405 is pivoted to the frame at 407; link 502 is pivoted to the frame at 503. Link 402, 404 is pivoted at 400 to link 344; the other end of link 344 is pivoted to the end of link 502 at 501 and to the end of link 403, 405 at 401. In the extreme limit of movement link 502 is substantially parallel to link 344.

(2) For shifting the circle on its center, it is provided with an arcuate rack 521 (Fig. 26) secured underneath the inwardly extending flange of circle 315. A pinion 522 (Fig. 18) engages rack 521. Pinion 522 is keyed in the lower end of shaft 523 which is journaled in casting 351 and in housing 524 which is secured to casting 351. Within housing 524 bevel gear 525 is secured to the upper end of shaft 523 and meshes with bevel pinion 526 secured to shaft 527. Shaft 527 is connected by universal joint 528 to square shaft 529 which telescopes in hollow square shaft 530, the upper end of which is connected by universal joint 531 (Fig. 24) to shaft 532 which passes through hollow shaft 514. The rear end of shaft 532 (Fig. 25) has a clutch member 533 secured thereto which is adapted to be engaged by clutch member 534 formed integrally with the hub 516 of hand wheel 517. Clutch members 533, 534 are engaged for operating shaft 532 by sliding hand wheel 517 in the direction of arrow 532 in Fig. 25. When so engaged, rotation of hand wheel 517 will result in rotation of pinion 522 (Fig. 18) causing rotation of circle 315 about its center. This adjustment is made to vary the angle of the cutting edge with respect to the longitudinal axis of the circle supporting frame, or, in other words, with respect to the line of draft. By reason of the telescopic connection between shaft 529, 530 and the universal joints 528, 531, the circle can be adjusted in any position of the circle supporting frame.

The hand wheel 517 comprises a selectively operable control for obtaining two adjustments of the circle; it can be pushed forwardly to shift the center of the circle, and pulled rearwardly to shift the circle on its own center.

The circle is adapted to be locked in adjusted position with respect to its supporting frame. For this purpose, the inwardly extending flange of circle 315 is provided with a series of notches 535 (Fig. 26) with which a locking pin 536 (Fig. 13) is adapted to be engaged. Locking pin 536 is supported in aligned apertures 537, 538, 539 in casting 351 and is adapted to be slid up and down therein. As the circle is shifted, the notches 535 are successively brought into alignment with apertures 537 to 539 and in the locking position locking pin 536 is lowered into engagement with one of the notches 535, thereby locking the circle with respect to the circle supporting frame. Bracket 540 is secured to casting 351 and supports pin 541 in a pair of lugs 542. A pair of arms 543 are pivoted to bracket 540 by a common integral hub 543' journaled on pin 541. Pin 544 having its ends secured to arms 543 underlies lever 545 which is pivoted at 546 in lugs 547 on bracket 540. The nose of lever 545 engages with slot 548 in locking pin 536 (Fig. 17). By rocking arms 543 counter-clockwise, (Fig. 13) pin 544 lifts the nose of lever 545 to withdraw pin 536 from notch 535, raising the locking pin to the position shown in Fig. 14. Locking pin 536 is urged into the locking position by spring 549. A seat 550 for the upper end of spring 549 is formed in bracket 540. The lower end of spring 549 bears against washer 551 which is retained by nut 552 on bolt 553 which passes through aperture 554 in lever 545. Locking pin 536 is automatically retained in its raised position against the urge of spring 549 by a ridge 555 on the under side of lever 545 which contacts pin 544. Arms 543 are operated by rod 556, and the end of web 557 on lever 545 acts as a limit stop against which pin 544 strikes when rod 556 is pulled to raise the locking pin. This end 557 is also designed to strike hub 543' (Fig. 13) of arms 543, to limit the downward movement of locking pin 536. Rod 556 extends upwardly and rearwardly and at its rear end is formed as a handle 558 (Fig. 1) which the operator grasps to operate the circle lock.

(3) For adjusting the plane of the circle with respect to the drawbars, there is provided a screw 560 (Fig. 18) the lower end of which is provided with an eye 561 through which pin 350 passes. Screw 560 is threaded through hub 562 of bevel gear 563 and passes through apertures 564, 565 in bracket 566 which is secured to drawbars 359, 360 (Fig. 12). The bracket is arranged so that bevel gear 563 and its hub 562 are restrained against axial movement, rotation thereof resulting in feeding screw 560 axially. A plate 567 (Fig. 18) is secured to bracket 566 and extends downwardly between the forward ends of side bars 342, 343 as a guide therefor and is provided with lugs 568 which serve as a limit stop. Bracket 566 is provided with an apertured boss 569 to support stub shaft 570. Bevel pinion 571 is secured at the forward end of stub shaft 570 and meshes with bevel gear 563. The rear end of shaft 570 is connected by universal joint 572 to hollow square shaft 573 within which square shaft 574 telescopes. The rear end of shaft 574 is connected by universal joint 575 to the front end of shaft 576 which is supported in bracket 576' having a depending portion interposed between angles 47, 48 of the main frame and secured thereto. The rear end of shaft 576 (Fig. 19) is connected by universal joint 577 to stub shaft 578 which is journaled in housing 152. Within housing 152 on shaft 578 is secured gear 579 which can be driven by pinion 154 by shifting pinion 154 into mesh therewith. This is effected by rotating lever 580 in the direction of the arrow in Fig. 19. Lever 580 is pivoted to housing 152 on pin 581, the lower end of which (Fig. 20) has a short crank 582 integral therewith from which depends a pin 583 engaging with grooved collar 584 (Fig. 19) on pinion 154. When pinion 154 is engaged with gear 579, operation of crank 156 turns bevel gear 563 (Fig. 18) to project or retract screw 560 thereby adjusting the circle with respect to the drawbars. Due to the telescopic connection between shafts 573 and 574 and universal joints 572 and 575, this adjustment can be made in any position of the circle or drawbars.

From the foregoing description it is seen that the adjustment of the plane of the circle with respect to the drawbars either raises or lowers the front end of the circle supporting frame. Such movement varies the angle of the cutting edge with surface of the ground if the blade is in its transverse position as shown in Fig. 1, which raises or lowers the front end of said blade if it is rotated from its transverse position as shown in Fig. 27, which illustrates one of the uses of this adjustment, the blade being positioned to act as a breaker plow.

It will be noted that sleeve 155 is hollow. This is for the purpose of admitting and supporting shaft 585 which is rotated by hand wheel 586 (Fig. 1) to operate a steering device, not shown, but which can be similar to that shown in the patent to Anderson, No. 1,256,283, issued February 12, 1918.

I, therefore, claim as my invention:

1. In a road machine, a frame, a ground support therefor, two movable shafts mounted in said frame, arms on said shafts, a blade, connections between said blade and said arms to support said blade, cams on said shafts and movable therewith to cooperate in adjusting said blade, and a resilient connection between said cams cooperating with said cams and counterbalancing said blade to facilitate adjustment of said blade.

2. In a road machine, a frame, a support for the rear end of said frame, a support for the front end of said frame, a second frame, means to support said second frame from said first frame, a draft connection from said second frame to said front end support, an angle piece supported by said second frame, the ends of said piece being joined, a beam, having a curved central portion and depending ends, said curved portion being fitted to said angle piece and secured thereto, a channel secured to said angle piece, means secured to said channel and to said depending beam ends, and a blade connected to said beam ends.

3. In a road machine, a frame, a ground support for said frame, a tool supporting frame having a draft connection at its forward end capable of limited universal movement and a crosspiece at its rear end, telescoping adjustable links having movable connections at their lower ends with the ends of said crosspiece, two movable shafts mounted in said first frame, arms on said shafts having movable connections with the upper ends of said links, grooved cams on said shafts and movable therewith for adjustment of the tool, flexible connections secured to said cams and engaging said grooves, springs secured to said connections for counterbalancing the weight of said tool supporting frame, and a movable connection between said springs for enabling tension equalization between said springs.

4. In a road machine, a main frame; a support for the front end of said machine; a support for the rear end of said machine; a tool supporting frame; a draft connection from said tool supporting frame to said front end support having a limited universal movement; lateral shift mechanism between said tool supporting frame and said main frame having means to enable shifting of said tool supporting frame substantially completely to one side of said machine with said tool at a high angle for bank sloping work; and adjustable means to support said tool supporting frame from said main frame, including two extensible lift links cooperable with said lateral shift mechanism, each link comprising an elongated tubular member, a second member telescoping within said tubular member, one of said members having apertures spaced along the length thereof and the other of said members having an aperture adapted to be aligned with a selected one of said spaced apertures, a securing member adapted to be inserted through any selected aligned apertures in said members, and means for clamping said members together.

5. In a road machine, a frame, a ground support therefor, a crosspiece on said frame, a rack slidably mounted on said crosspiece and having apertured lugs, a housing mounted on said frame, a shaft journaled in said housing carrying a worm gear and a pinion engaging said rack, a second shaft journaled in said housing and in a bracket on said frame carrying a clutch element and a worm engaging said worm gear, operating means rotatably and shiftably mounted on said second shaft and having a second clutch element adapted to engage said first named clutch element, a tool carrying frame adjustably supported from said first frame, including an apertured cross bar, and a link adapted to engage an aperture in said cross bar and one of said apertured lugs.

6. In a road machine, a frame, a ground support therefor, a second frame, a tool carrying circle rotatably mounted on said second frame and having a rack formed thereon, a housing mounted on said second frame, a shaft journaled in said housing, carrying a bevel gear and a pinion engaging said rack, a second shaft journaled in said housing carrying a bevel pinion engaging said bevel gear, a flattened shaft having a universal connection with said second shaft, a hollow flattened shaft receiving said first flattened shaft, a third shaft mounted on said first frame carrying a clutch element and having a universal connection with said hollow flattened shaft, and operating means mounted on said third shaft and having a second clutch element adapted to engage said first named clutch element.

7. In a road machine, a frame, a support for the front end of said frame, a support for the rear end of said frame, a second frame adjustably supported from said first frame, a pair of forwardly converging drawbars having their rear ends pivotally secured to said second frame intermediate its length and having a draft connection with said front end support, a bracket secured to said drawbars, a gear journaled in said bracket having external teeth and internal threads, a screw threaded through said gear and having a pivotal connection with the front end of said second frame, a shaft journaled in said bracket carrying a pinion engaging the teeth of said gear, operating means mounted on said first frame, and an extensible connection universally connected to said shaft and said operating means.

8. In a road machine, a frame, a support for the front end of said frame, a support for the rear end of said frame, a second frame adjustably supported from said first frame, a pair of forwardly converging drawbars having their rear ends pivotally secured to said second frame intermediate its length and having a draft connection with said front end support, a bracket secured to said drawbars, a gear journaled in said bracket having external teeth and internal threads, a screw threaded through said gear and having a pivotal connection with the front end of said second frame, a shaft journaled in said bracket carrying a pinion engaging the teeth of said gear, operating means mounted on said first frame, an extensible connection universally connected to said shaft and said operating means, and means for limiting the relative movement of said drawbars and said second frame comprising a plate secured to said bracket and having lugs adapted to engage said second frame.

9. In a road machine, a frame, a support for the rear end of said frame, a support for the front end of said frame including tiltable wheels, a tool supporting frame adjustably supported from said first frame, a draft connection from said front end support to said tool supporting frame, means for adjusting the plane of said tool supporting frame with respect to said draft connection, operating means therefor including an extensible connection, a housing on said first frame, a shaft journaled in said housing carrying a gear and having a universal connection with said extensible connection, means for tilting said wheels, operating means for said tilting means including a second extensible connection, a second shaft journaled in said housing universally connected to said second extensible connection, and carrying a gear offset in said housing from said first gear, a sleeve journaled in said housing and having a pinion splined thereon, and a lever for shifting said pinion into engagement with either of said gears.

10. In a road machine having a wheeled frame, a tool supporting frame, and a tool, means for adjusting said tool to make an angle cut, comprising means including extensible lift links connected to said tool supporting frame for adjusting the ends of said tool vertically, means including a member adjustable transversely on said wheeled frame and a substantially rigid connecting member connected at one end to said tool supporting frame and adjustable at its other end to a selected one of a plurality of connecting positions on said transversely adjustable member for adjusting said tool supporting frame and said tool transversely with respect to said wheeled frame through any selected one of a plurality of ranges of lateral movement, and means providing for adjustment of said tool transversely with respect to said tool supporting frame.

11. In a road machine, a frame, a tool, a pair of opposite lift means for adjusting said tool with respect to said frame, a resilient connection between said lift means, and means operated by operation of said lift means for varying the tension of said resilient connection in accordance with the adjusted position of said tool.

12. In a road machine, a frame, a tool, a pair of opposite lift means for adjusting said tool with respect to said frame, resilient means connected to each of said lift means, a connection between said resilient means, and means for simultaneously adjusting the tension of said resilient means.

13. A road machine comprising a main frame, a tool supporting frame, means including spaced lift members connecting said tool supporting frame for adjustment relative to said main frame, and a free running automatic equalizing connection shiftable as a unit from end to end and common to and connected to both of said members for effecting counter-balancing of said tool supporting frame during lifting operation of either one of said members or both of said members together.

14. A road machine comprising a main frame, a tool supporting frame, means including spaced lift members connecting said tool supporting frame for adjustment relative to said main frame, a resilient equalizing connection common to and connected at its ends to both of said members, and a sheave freely journaled on said main frame and about which an intermediate portion of said connection has free contact.

15. A road machine comprising a main frame; a tool supporting frame positionable beneath said main frame; a tool connected to said tool supporting frame; spaced connections between said main frame and said tool supporting frame including lift links adjustable as to length; and mechanism cooperable with said lift links for positioning and maintaining said tool supporting frame with the tool thereon at a high bank sloping angle to one side of said main frame comprising a substantially rigid member connected to said tool supporting frame, and a second member mounted for transverse shifting movement on said main frame and having a plurality of fastening stations thereon to any selected one of which said substantially rigid member is adapted for connection; the connection of said tool to said tool supporting frame including means providing for endwise shiftable positioning of said tool with respect to said tool supporting frame to facilitate obtaining said high-angle position of said tool.

16. A road machine comprising a main frame; a tool positionable beneath said main frame; spaced connections between said main frame and said tool including lift links adjustable as to length; and mechanism cooperable with said lift links for positioning and maintaining said tool at an angle to one side of said main frame comprising a substantially rigid member connected with said tool, and a second member mounted for shifting movement on said main frame transversely thereof and having a plurality of fastening stations thereon to any selected one of which said substantially rigid member is adapted for connection, an inner one of said fastening stations with reference to a side of said main frame serving as a point of connection for said substantially rigid member for normal working operation of said tool beneath said main frame, and another of said fastening stations located outside of said inner fastening station with reference to said side of said main frame serving as a point of connection for said substantially rigid member during angle positioning of said tool.

17. A road machine comprising a main frame; a tool supporting frame positionable beneath said main frame; a tool connected to said tool supporting frame; spaced connections between said main frame and said tool supporting frame including spaced arms each mounted on said main frame for rotation about an axis, and lift links adjustable as to length and movably connected both to said arms and to said tool supporting frame; and mechanism cooperable with said lift links for positioning and maintaining said tool supporting frame with the tool thereon at a high angle to one side of said main frame comprising a substantially rigid member connected to said tool supporting frame, and a second member mounted for shifting movement on said main frame transversely thereof and adapted to be shifted to a position wherein an end thereof is adjacent a side of said main frame, said second member having a plurality of fastening stations thereon to any selected one of which said substantially rigid member is adapted for connection, one of said fastening stations being located inwardly of said end of said second member with reference to said side of said main frame and serving as a point of connection for said substantially rigid member for normal working operation of said tool beneath said main frame, and another of said fastening stations being located adjacent said end of said second member and serving as a point of connection for said substantially rigid member during high-angle positioning of said tool.

18. In a road machine, a frame, a ground support therefor, a blade, adjustable means to support said blade from said frame including spaced lift members, means including a shaft connected to each of said lift members for moving said lift members, and means including a resilient connection between said shafts for facilitating adjustment of said blade.

19. In a machine of the class described, a frame, a ground support therefor, an earth engaging tool, lift arms on said frame oscillatable through an arc and connected to said tool, means including a shaft connected to each of said lift arms for moving said arms, and means for counterbalancing said tool comprising a resilient connection between and common to said shafts.

20. In a road machine comprising a main frame, a blade, a blade supporting frame, means including lift members connecting said blade supporting frame for adjustment relative to said main frame to either side thereof, said lift members being connected adjacent one of the ends thereof to said blade supporting frame, means including a shaft connected to the opposite end of each lift member for moving said lift members, and means including an equalizing connection common to and connected to said shafts for effecting counterbalancing of said blade supporting frame during lifting operation of either one of said lift members or both of said lift members together, the connection of said equalizing connection to said shafts causing said equalizing connection to be affected only by movement caused by operation of said lift members.

21. In a road machine, a main frame; a tool supporting frame; a draft connection for said tool supporting frame having a movable connection with said main frame; lateral shift mechanism between said tool supporting frame and said main frame having means to enable shifting of said tool supporting frame substantially completely to one side of said machine with said tool at a high angle for bank sloping work; and adjustable means to support said tool supporting frame from said main frame including extensible lift links cooperable with said lateral shift mechanism, each link comprising an elongated tubular member open at one end and having a universal connection to one of said frames adjacent the opposite end thereof, a second member having one end telescoping within said tubular member through said open end and having a universal connection with the other of said frames adjacent the opposite end thereof, the length of said tubular member being such as to house completely the end of said second member in all relative positions between said members whereby no portion of said second member can project through the end of said tubular member opposite the open end thereof, one of said members having apertures spaced along the length thereof and the other of said members having an aperture adapted to be aligned with a selected one of said spaced apertures, and a securing member adapted to be inserted through any selected aligned apertures in said members.

22. In a road machine, a main frame; a tool supporting frame; a draft connection for said tool supporting frame having a movable connection with said main frame; means to support said tool supporting frame from said main frame including spaced lift links adjustable as to length; and means constructed to be substantially rigid against lateral flexing and cooperable with said lift links for positioning and maintaining said tool at a high bank sloping angle substantially completely to one side of said main frame comprising lateral shift mechanism between said tool supporting frame and said main frame including a train of cooperating pivotally connected members one of which comprises a rigid member movable relative to said tool supporting frame and having a plurality of fastening stations thereon and another of said members being rigid and connectable to any selected one of said fastening stations.

23. In a road machine, a main frame; a tool supporting frame; a draft connection for said tool supporting frame having a movable connection with said main frame; means to support said tool supporting frame from said main frame including spaced lift links adjustable as to length; each of said lift links comprising an elongated tubular member, a second elongated member telescoping within said tubular member, one of said members having apertures spaced along the length thereof and the other of said members having an aperture adapted to be aligned with a selected one of said spaced apertures, and a securing member adapted to be inserted through any selected aligned apertures in said members; and means constructed to be substantially rigid against lateral flexing and cooperable with said lift links for positioning and maintaining said tool at a high bank sloping angle substantially completely to one side of said main frame comprising lateral shift mechanism between said tool supporting frame and said main frame including a train of cooperating pivotally connected members one of which comprises a rigid member movable relative to said tool supporting frame and having a plurality of fastening stations thereon and another of said members being rigid and connectable to any selected one of said fastening stations.

24. A road machine comprising a main frame; a tool supporting frame positionable beneath said main frame; a draft connection for said tool supporting frame having a movable connection with said main frame; spaced connections between said main frame and said tool supporting frame including lift links adjustable as to length; and means constructed to be substantially rigid against lateral flexing and cooperable with said lift links for positioning and maintaining said tool supporting frame at a high angle at a side of said main frame comprising lateral shift mechanism between said tool supporting frame and said main frame including a substantially rigid member mounted for transverse movement on said main frame and having spaced fastening stations thereon, and a rigid link member connected to said tool supporting frame and to a selected one of said fastening stations.

25. A road machine comprising a main frame; a tool supporting frame positionable beneath said main frame; a draft connection for said tool supporting frame having a movable connection with said main frame; spaced connections between said main frame and said tool supporting frame including lift links adjustable as to length; each of said lift links comprising a tubular member, a second member telescoping within said tubular member, one of said members having apertures spaced along the length thereof and the other of said members having an aperture adapted to be aligned with a selected one of said spaced apertures, and a securing member adapted to be inserted through any selected aligned apertures in said members; and means constructed to be substantially rigid against lateral flexing and cooperable with said lift links for positioning and maintaining said tool supporting frame at a high angle at a side of said main frame comprising lateral shift mechanism between said tool supporting frame and said main frame including a substantially rigid member mounted for transverse movement on said main frame and having spaced fastening stations thereon, and a rigid link member connected to said tool supporting frame and to a selected one of said fastening stations.

26. A road machine comprising a main frame; a tool supporting frame positionable beneath said main frame; a draft connection for said tool supporting frame having a movable connection with said main frame; spaced connections between said main frame and said tool supporting frame including lift links adjustable as to length; and means constructed to be substantially rigid against lateral flexing and cooperable with said lift links for positioning and maintaining said tool supporting frame at a high angle at a side of said main frame comprising lateral shift mechanism between said tool supporting frame and said main frame including a substantially rigid rack bar mounted for transverse movement on said main frame and having a fastening station adjacent each end thereof adapted upon movement of the rack bar to be projected beyond the associated side of said main frame, and a rigid link member connected to said tool supporting frame and to a selected one of said fastening stations; and means for actuating said rack bar comprising a pinion meshing with the rack thereon.

27. In a road machine having a main frame and a tool; means including rotatable crank arms mounted on said main frame and lift links adjustable as to length connected between said crank arms and said tool for adjusting the ends of said tool vertically with respect to said main frame; and means cooperable with said lift links for adjusting said tool laterally with respect to said main frame to position said tool substantially completely to one side of said machine for bank sloping work including an elongated member mounted for transverse adjustment on said main frame and having a plurality of spaced fastening stations thereon, and a substantially rigid link member connected between said tool and said main frame and fastened at one end to a selected one of said fastening stations.

28. A road machine comprising a main frame; a tool supporting frame positionable beneath said main frame; a draft connection for said tool supporting frame having a movable connection with said main frame; spaced connections between said main frame and said tool supporting frame including lift links adjustable as to length; and means constructed to be substantially rigid against lateral flexing and cooperable with said lift links for positioning and maintaining said tool supporting frame at a high angle substantially completely to one side of the machine comprising lateral shift mechanism between said tool supporting frame and said main frame including an elongated substantially rigid member mounted for transverse movement on said main frame and having a fastening station adjacent each end thereof, the extent of movement of said elongated member being such as to enable each of said fastening stations to be projected beyond a side of said main frame, and a rigid link member connected to said tool supporting frame and to a selected one of said fastening stations.

CARL A. GUSTAFSON.